April 11, 1939.  F. W. SAMPSON  2,154,077

UNIVERSAL JOINT

Filed May 28, 1937

Inventor
Frederick W. Sampson

By Blackmore, Spencer & Flint
Attorneys

Patented Apr. 11, 1939

2,154,077

UNITED STATES PATENT OFFICE 2,154,077

UNIVERSAL JOINT

Frederick W. Sampson, Dayton, Ohio, assignor to General Motors Corporation, Detroit, Mich., a corporation of Delaware Application May 28, 1937, Serial No. 145,178

3 Claims. (Cl. 64—11)

This invention has to do with a universal joint drive coupling between a pair of shafts and involves a rubber ring interposed between a pair of concentric driving and driven members for action in torsion in transmitting rotation between the coupled parts and yielding under stress to accommodate misalignment and relative axial and angular displacement of the shafts during operation.

Joints of this type heretofore proposed are unsatisfactory and fail to meet practical requirements due particularly to the likelihood of slippage of the parts under torque and the tendency of the shafts to whip badly under centrifugal force. Careful study of the problems involved led to the joint to be herein described which in general consists of a pair of spaced concentric driving and driven members having a rubber spacer and drive transmitting ring therebetween vulcanized to both members to insure a positive bond against slippage and held under radial compressive force for centering the parts, the ring acting in torsion to impart rotation between the driving and driven members and serving as a cushion to damp vibration and to impede transmission of noise and yielding in all directions necessary to accommodate angular relations which occur between the driving and driven members during operation.

Among the objects of the invention is the provision of a non-lubricated joint having no mechanical limit of torsional flexibility and being capable of endwise and angular flexibility and wherein the parts are self-centering at all times and are arranged to prevent relative torsional displacement or slippage.

Figure 1:
Figure 2:
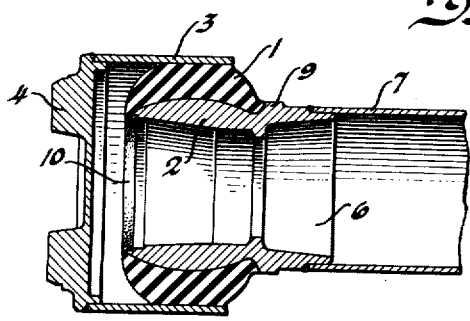
Figure 3:
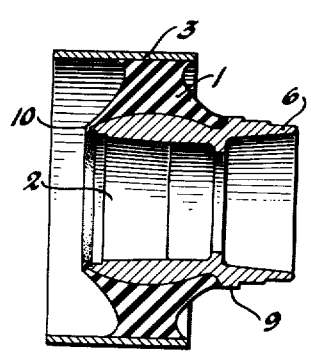
Figure 4:
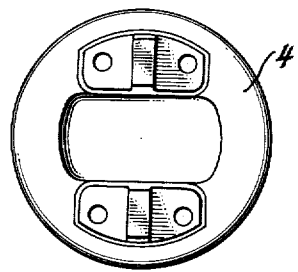
Figure 5:
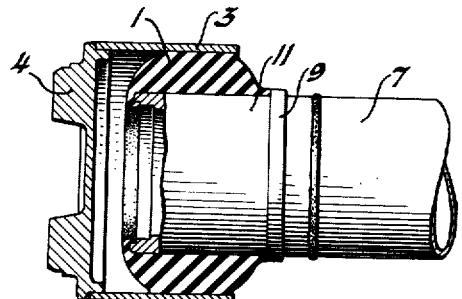
Figure 6:
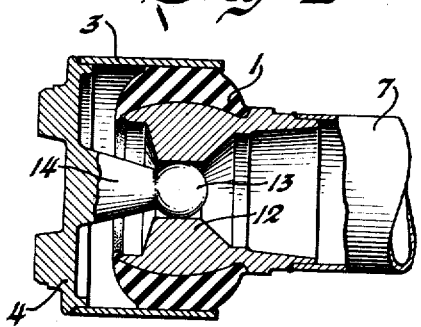
Figure 7:
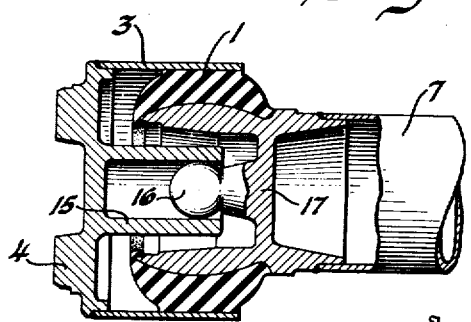

Other objects and advantages of the invention will become apparent during the course of the following specification having reference to the accompanying drawing wherein Figure 1 is an elevation showing an installation of the joint in a propeller shaft for motor vehicles; Figure 2 is a detail sectional view of the completed joint; Figure 3 is a sectional view showing the parts during the course of manufacture; Figure 4 is an end view of the joint and Figures 5, 6 and 7 are sectional views of modifications.

Referring to the drawing, the numeral 1 indicates a ring of rubber or other suitable elastic deformable material, interposed between a pair of spaced concentric inner and outer members 2 and 3, respectively. The inner member 2, by preference, is a forging and the outer member 3 in the form of a cylindrical sleeve, is made from seamless tubing cut to proper length. One end is fitted to a shouldered seat and welded on the attaching disc 4 by which it may be connected to a driving shaft 5 as shown in Figure 1. Projecting in the opposite direction from the joint is an extension 6 on the inner member 2 to which is fitted and welded a tubular propeller shaft 7. At its opposite end the propeller shaft is similarly coupled to an output shaft 8. Misalignment of the several shafts and their disposition on axes angularly related is taken care of by the internal action of the rubber ring.

In order to avoid slippage between the parts during the transmission of drive the inner and outer surfaces of the rubber ring are vulcanized or otherwise secured by surface union to the inner member 2 and outer member 3, respectively. Additionally, the rubber is interposed between the parts under suitable radial compressive stress so that the parts are centered in relation to each other and the elastic reaction affords radial stability. To assist in preventing displacement of the abutting surfaces of the rubber ring and inner member 2 the inner member is provided with the peripheral flange 9 for abutment with one side of the rubber in the inner region thereof and the end of the inner member is fitted within a pocket in the inturned annular flange 10 of the rubber in overlapping relation with the edge of the inner member. The peripheral surface of the inner member may also be made substantially spherical in shape with its center on the axis about which the joint oscillates upon angularity of the shaft sections to be joined. Accordingly the radial dimension of the rubber ring is smallest medially of the joint so that action of the rubber in permitting angular shaft movement is primarily in shear and tension.

In the formation of the joint the parts are initially shaped and fitted together as seen in Figure 3 wherein it will be noted that the rubber ring in axial cross section is of substantially hourglass shape and the outer sleeve 3 is larger in diameter than its diameter in the completed form of the joint. After the parts are secured by vulcanization or otherwise, the outer member or sleeve 3 is subjected to a swaging or other compression operation which causes its contraction and places the rubber under a compressive stress radially particularly in the outer region thereof. As a result the narrow neck of the ring is spread axially in both directions and the side faces are bulged outwardly from the concave shape illustrated in Figure 3 to the convex form shown in Figure 2. In addition to the resulting radial stability the force imposed upon the rubber serves to augment the vulcanized bond in insuring a non-slipping bond between the rubber and the inner and outer metal members.

In lieu of a spherical inner member a plain cylindrical core 11 may be used and the resulting construction will be that shown in Figure 5. Radial compression of the rubber provides ample self-centering for most installations, but if mechanical centering is desired this may be accomplished as illustrated in Figures 6 and 7. In Figure 6 the inner member is provided with an internal rib 12 having a central opening to receive a bearing ball 13 on the end of a stud 14 projecting inwardly from the fastening disc 4. Alternately the disc may be provided with a tubular projection 15 as seen in Figure 7 to seat the ball stud 16 projecting axially from the transverse web 17 on the inner member.

From the above description it will be apparent that when the axes of the driving and driven shafts do not coincide or are angularly related, or move endwise relative to one another the rubber ring is distorted, yet functions properly as the agency through which power is transmitted without inducing vibration, run out or whipping of the parts. There being no embedded radially overlapping projections or mechanical keying of any sort between the central member and outer sleeve, the transmission of torque is solely through the rubber without mechanical limit, and this torsional stressing occurs without slippage of the rubber.

I claim:

1. The method of forming a universal joint coupling of the type wherein a rubber ring acts in torsion to transmit drive and is deformable radially and axially to accommodate universal joint action, forming a rubber ring which varies in width and is narrowest in a region toward the outer rim to present concave side faces, vulcanizing said ring to both an outer tubular member and a concentric inner member, and then swaging the outer tubular member to reduce its over-all diameter uniformly throughout its vulcanized area and place radial pressure on the ring particularly in the narrow outer region thereof to spread the same axially and cause said side faces to budge outwardly to convex shape.

2. The method of forming a universal joint drive coupling of the type in which a torsional rubber ring imparts drive between a pair of spaced concentric members, including forming a rubber ring of substantially hourglass section axially with its narrow neck in the region of the outer periphery, vulcanizing the ring to radially spaced inner and outer members and then forcibly reducing the over-all diameter of the outer member to contract the assembly radially and spread the outer region of the ring axially until its side faces bulge outwardly.

3. In a universal joint drive coupling for connecting driving and driven shafts arranged end to end, an inner member rigid with one of the shafts and having a peripheral flange axially spaced from the end thereof, a rubber ring surrounding said member and being vulcanized thereto with one side bearing against said flange and the other side having an inturned annular lip overlapping the end of the member, and a tubular outer member rigid with the other shaft and embracing said rubber ring in concentric relation to the inner member, said rubber ring being vulcanized to the tubular member and being held throughout its axial extent under radial compression through the over-all contraction of the tubular member after assembly.

FREDERICK W. SAMPSON.

CERTIFICATE OF CORRECTION.

Patent No. 2,154,077.                                    April 11, 1939.

FREDERICK W. SAMPSON.

It is hereby certified that error appears in the printed specification of the above numbered patent requiring correction as follows: Page 2, first column, line 38, claim 1, before the word "forming" insert including; and second column, line 9, same claim, for "budge" read bulge; and that the said Letters Patent should be read with this correction therein that the same may conform to the record of the case in the Patent Office.

Signed and sealed this 6th day of June, A. D. 1939.

(Seal)

Henry Van Arsdale

Acting Commissioner of Patents.

ber serves to augment the vulcanized bond in insuring a non-slipping bond between the rubber and the inner and outer metal members.

In lieu of a spherical inner member a plain cylindrical core 11 may be used and the resulting construction will be that shown in Figure 5. Radial compression of the rubber provides ample self-centering for most installations, but if mechanical centering is desired this may be accomplished as illustrated in Figures 6 and 7. In Figure 6 the inner member is provided with an internal rib 12 having a central opening to receive a bearing ball 13 on the end of a stud 14 projecting inwardly from the fastening disc 4. Alternately the disc may be provided with a tubular projection 15 as seen in Figure 7 to seat the ball stud 16 projecting axially from the transverse web 17 on the inner member.

From the above description it will be apparent that when the axes of the driving and driven shafts do not coincide or are angularly related, or move endwise relative to one another the rubber ring is distorted, yet functions properly as the agency through which power is transmitted without inducing vibration, run out or whipping of the parts. There being no embedded radially overlapping projections or mechanical keying of any sort between the central member and outer sleeve, the transmission of torque is solely through the rubber without mechanical limit, and this torsional stressing occurs without slippage of the rubber.

I claim:

1. The method of forming a universal joint coupling of the type wherein a rubber ring acts in torsion to transmit drive and is deformable radially and axially to accommodate universal joint action, forming a rubber ring which varies in width and is narrowest in a region toward the outer rim to present concave side faces, vulcanizing said ring to both an outer tubular member and a concentric inner member, and then swaging the outer tubular member to reduce its over-all diameter uniformly throughout its vulcanized area and place radial pressure on the ring particularly in the narrow outer region thereof to spread the same axially and cause said side faces to budge outwardly to convex shape.

2. The method of forming a universal joint drive coupling of the type in which a torsional rubber ring imparts drive between a pair of spaced concentric members, including forming a rubber ring of substantially hourglass section axially with its narrow neck in the region of the outer periphery, vulcanizing the ring to radially spaced inner and outer members and then forcibly reducing the over-all diameter of the outer member to contract the assembly radially and spread the outer region of the ring axially until its side faces bulge outwardly.

3. In a universal joint drive coupling for connecting driving and driven shafts arranged end to end, an inner member rigid with one of the shafts and having a peripheral flange axially spaced from the end thereof, a rubber ring surrounding said member and being vulcanized thereto with one side bearing against said flange and the other side having an inturned annular lip overlapping the end of the member, and a tubular outer member rigid with the other shaft and embracing said rubber ring in concentric relation to the inner member, said rubber ring being vulcanized to the tubular member and being held throughout its axial extent under radial compression through the over-all contraction of the tubular member after assembly.

FREDERICK W. SAMPSON.

---

CERTIFICATE OF CORRECTION.

Patent No. 2,154,077.   April 11, 1939.

FREDERICK W. SAMPSON.

It is hereby certified that error appears in the printed specification of the above numbered patent requiring correction as follows: Page 2, first column, line 38, claim 1, before the word "forming" insert including; and second column, line 9, same claim, for "budge" read bulge; and that the said Letters Patent should be read with this correction therein that the same may conform to the record of the case in the Patent Office.

Signed and sealed this 6th day of June, A. D. 1939.

(Seal)

Henry Van Arsdale

Acting Commissioner of Patents.